Patented June 9, 1936

2,043,824

UNITED STATES PATENT OFFICE 2,043,824

MANUFACTURE OF SYNTHETIC RESINS

Henry G. Berger, Woodbury, N. J., assignor to Socony-Vacuum Oil Company, Incorporated, New York, N. Y., a corporation of New York No Drawing. Application January 26, 1935, Serial No. 3,648

3 Claims. (Cl. 260—2)

This invention relates to the manufacture of synthetic resins suitable for use in varnishes, molding compositions, etc.

The purpose of the invention is to provide a simple and inexpensive method for the synthesis of resins of the type in question and particularly a method in which the principal raw material is a waste material produced in the refining of petroleum products.

In certain well known methods for refining lubricating oils and naphthas, the hydrocarbon materials are treated with anhydrous aluminum chloride, or other active metal halide, with the object of removing undesirable asphaltic and unsaturated constituents. The materials so removed combine with the aluminum chloride to form a sludge, which is of no value but constitutes a troublesome waste material. The aluminum chloride may be washed from the sludge in hydrated form, and the remaining hydrocarbon material is somewhat resinous in character, but is not suitable for the ordinary uses of synthetic resins.

I have discovered that if sludge of the kind in question is reacted with chlorine-containing material in the form either of free chlorine or of a volatile chlorinated hydrocarbon, such as carbon tetrachloride, and the reaction complex is then decomposed by the addition of water, it separates into a water solution and a solid resin. This resin, when ground and washed is ready, without further preparation, for use as a constituent of molding compositions, being hard, heat plastic, and insoluble in all ordinary solvents. It is dark brown in color and contains some combined chlorine.

As an example of this process, the sludge produced by treating petroleum cylinder stock with aluminum chloride for two hours, at a temperature of approximately 120° C., was used as the raw material. The sludge was freed from uncombined oil by extraction with solvent naphtha, and was then treated with free chlorine, at a temperature of 95° C., by slowly bubbling the chlorine through it for four hours. The mass was then drowned with a weak solution of hydrochloric acid, and decomposed into a water solution and the solid resin.

The time necessary for adequate chlorination necessarily varies somewhat with conditions, but is determined with relation to the condition of the resinous product, which will be of a more or less viscous and sticky character if the chlorination is incomplete.

As an example of the use of a chlorinated hydrocarbon, in place of free chlorine, the sludge may be introduced slowly into an excess of boiling carbon tetrachloride, the mixture heated at a temperature of about 76° C. for 15 minutes, and the remaining carbon tetrachloride decanted. The reaction complex is then decomposed with water or dilute hydrochloric acid, and the solid resin is ground, washed and dried.

In place of carbon tetrachloride, chlorinated petroleum naphtha, chlorinated propane or penta-chlor-butane may be used, with similar results.

I claim as my invention:

1. The method of making synthetic resin from the sludge resulting from the refining of hydrocarbon oil with an active metal halide, which comprises the steps of separating such sludge from the oil reacting the sludge with material selected from the class consisting of free chlorine, carbon tetrachloride, chlorinated petroleum naphtha, chlorinated propane and penta-chlor butane, until the hydrocarbon constituents of the sludge have been converted to a hard, heat-plastic resin, and freeing such resin from water-soluble materials.

2. The method of making synthetic resin from the sludge resulting from the refining of hydrocarbon oil with an active metal halide, which comprises the steps of separating such sludge from the oil contacting the sludge with chlorine gas until the hydrocarbon constituents of the sludge have been converted to a hard heat-plastic resin, and freeing such resin from water-soluble materials.

3. The method of making synthetic resin from the sludge resulting from the refining of hydrocarbon oil with an active metal halide, which comprises the steps of separating such sludge from the oil, heating it in contact with a chlorinated light hydrocarbon until the hydrocarbon content of the sludge has been converted into a hard heat-plastic resin, and washing said resin to free it from water-soluble materials.

HENRY G. BERGER.